US010887427B1

(12) United States Patent
Adnan et al.

(10) Patent No.: US 10,887,427 B1
(45) Date of Patent: Jan. 5, 2021

(54) SYSTEM FOR AUTOMATIC SCALING TO PROCESS REQUESTS

(71) Applicant: AMAZON TECHNOLOGIES, INC., Seattle, WA (US)

(72) Inventors: Mohammad Adnan, Ambedkar Nagar (IN); Manoj Tharwani, Bangalore (IN)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 26 days.

(21) Appl. No.: 16/190,934

(22) Filed: Nov. 14, 2018

(51) Int. Cl.
*H04L 29/08* (2006.01)
*H04L 29/06* (2006.01)

(52) U.S. Cl.
CPC .............. *H04L 67/32* (2013.01); *H04L 67/42* (2013.01)

(58) Field of Classification Search
CPC ... H04L 67/12; H04L 67/1097; H04L 1/0002; H04L 1/0041; H04L 5/0064; H04L 1/18; H04L 67/10; H04L 67/32; H04L 67/2842; H04L 45/22; H04L 47/122; H04L 47/25; H04L 65/608; H04L 67/28; H04L 67/2857; H04L 67/2885; H04L 67/289; H04L 45/125; H04L 67/04; H04L 41/0893; H04L 41/0896; H04L 41/5029; H04L 43/08; H04L 47/14; H04L 47/19; H04L 63/08; H04L 67/145; H04L 67/2833; H04L 67/288; H04L 67/2895; H04L 12/14; H04L 12/1403; H04L 12/1492; H04L 12/1496; H04L 41/5006; H04L 41/5022; H04L 41/5051; H04L 41/5054; H04L 43/0882; H04L 47/12; H04L 67/306; H04L 1/0009; H04L 1/1874; H04L 67/34; H04L 43/0817; H04L 43/16; H04L 63/10; H04L 41/0806; H04L 47/20; H04L 41/0206; H04L 41/0233; H04L 41/069; H04L 41/082; H04L 41/0873; H04L 41/5003; H04L 41/5025; H04L 41/0876; H04L 43/10; H04L 47/2408; H04L 51/046; H04L 63/0236; H04L 63/04; H04L 63/0428; H04L 63/0853; H04L 63/0892;
(Continued)

(56) References Cited

U.S. PATENT DOCUMENTS

2009/0037421 A1\* 2/2009 Gamble ................ G06F 16/951
2012/0166532 A1\* 6/2012 Juan .................... G06Q 30/0224
709/204

(Continued)

*Primary Examiner* — Djenane M Bayard
(74) *Attorney, Agent, or Firm* — Lindauer Law, PLLC

(57) ABSTRACT

Techniques for automatically activating a count of device-independent functions to process a received request and other predicted traffic include determining a current count of active functions, a count of functions currently processing requests, a duration for execution of a function, an average time used by a function to process a request, and a current count of client devices accessing the system. A probabilistic value indicating the likelihood of additional traffic may also be determined based on characteristics of the request. These values are used to determine the available capacity for processing requests using the currently active functions and the predicted capacity to be used to process predicted additional traffic. A number of additional functions may be activated based on the difference between the available capacity and the predicted capacity.

20 Claims, 6 Drawing Sheets

(58) Field of Classification Search
CPC ..... H04L 63/20; H04L 67/26; H04L 67/2819;
H04L 67/327; H04L 9/32; H04L 9/3247;
H04L 29/08; H04L 1/00; H04L 1/0026
See application file for complete search history.

(56) References Cited

U.S. PATENT DOCUMENTS

| | | | |
|---|---|---|---|
| 2019/0050258 A1* | 2/2019 | Kim | G06F 9/5011 |
| 2019/0250949 A1* | 8/2019 | Chen | H04L 41/082 |

* cited by examiner

SYSTEM FOR AUTOMATIC SCALING TO PROCESS REQUESTS

BACKGROUND

When requests and other types of traffic are received from client devices, different types of services may be used to process the requests. If an insufficient number of host devices are active to process a current amount of traffic, requests may fail or significant latency may be experienced. However, maintaining a number of host devices in excess of what is needed to process a current amount of traffic may unnecessarily consume computational resources. In lieu of maintaining active host devices, serverless (e.g., device-independent) architectures, such as Function-as-a-Service (FaaS) may be used to run code on an as-needed basis to process requests as they are received. However, if an insufficient number of services are active to process an increase in traffic, the time used to initiate new services may incur latency or cause requests to fail.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1A:
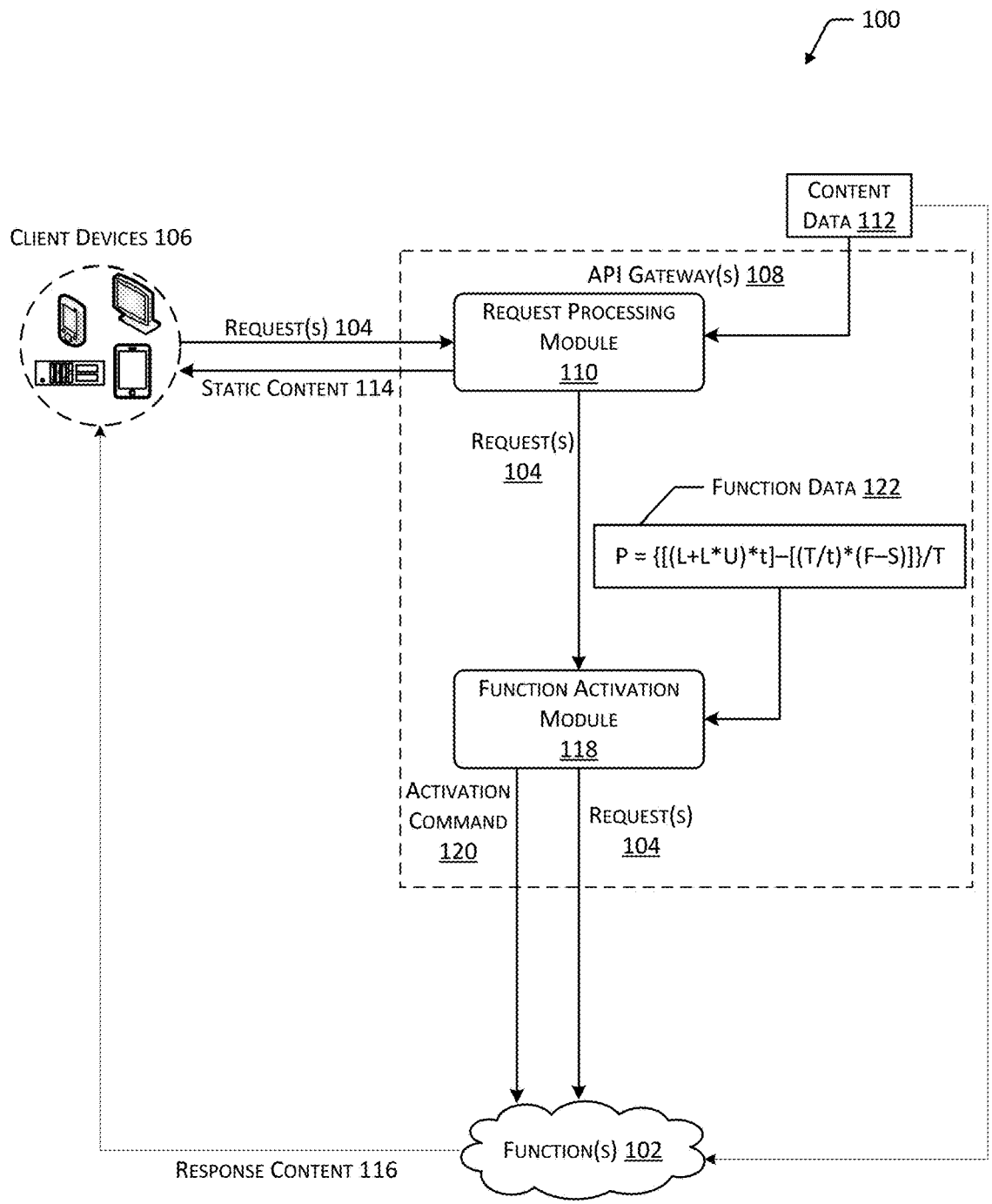
FIGS. 1A-1C depict implementations of a system for determining a quantity of serverless functions or other types of services, processes, or functions, to be activated in response to receiving one or more requests from one or more client devices.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

The quantity of requests and other types of traffic received by a fleet of host servers or other components of a system may vary significantly based on time and other factors. For example, an online store, through which various items may be offered for sale and purchased, may include a collection of network-accessible services executed on computer hardware that provides multiple channels through which customers, using a client computing device, may access various catalogs stored in databases to find various products and services available to purchase, lease, and so forth. An online store may receive requests from buyers to view information regarding items available for purchase, requests from sellers to modify the information associated with items, requests from buyers to initiate a workflow to purchase one or more items, requests from sellers to modify characteristics of a purchase for certain items, and so forth. The number of requests received by an online store may vary based on time or other conditions. For example, an online store may receive a larger number of requests during holidays, weekend days, and evening hours than during other time periods. Each request that is received is typically processed by a host server or similar computing device executing one or more services. During times when large quantities of requests are received, a larger amount of computational resources may be used to process requests when compared to times when smaller quantities of requests are received.

Many systems will maintain a certain quantity of devices or services that are continuously active to process requests, to ensure that sufficient computational resources are readily available to process incoming requests, even during times when the amount of requests that is received sharply increases. However, during times when only a small number of requests are received, maintenance of a large quantity of devices or services in an active state may incur an unnecessary financial or computational cost due to a significant quantity of unused computational resources. One method by which the computational cost associated with maintenance of unused computational resources may be reduced includes use of serverless (e.g., device-independent) architectures, such as use of Function-as-a-Service (FaaS) architectures to process requests. For example, FaaS architectures may enable an individual function (e.g. code) to be executed using one or more hardware processors, without requiring a user to manage or control particular servers, host devices, or other types of computing devices. Continuing the example, use of a FaaS architecture may enable a function to be executed, on demand, using the computational resources of one or multiple computing devices that communicate using one or more networks, and may not necessarily be controlled or provisioned by the owner of the function. For example, an active device-independent function may be used, on demand, in response to a received request, to process the request. The device-independent function may become inactive after expiration of a default or user-selected duration. However, if no device-independent function that is appropriate to process a received request is active at the time that the request is received, activation of a new function to process the request may occur on any of the networked devices able to accommodate the function. The activation of a function, sometimes referred to as a "cold start" may sometimes require a significant quantity of time, such as from 5 to 30 seconds or longer, introducing significant delays or latency that may negatively impact a user's experience.

Described in this disclosure are techniques for automatically activating a suitable number of device-independent functions to process incoming requests and other predicted traffic from client devices. When a request is received, a total number of functions (F) that are currently active and available to process requests is determined. An available capacity value (C) for a system may be determined based in part on the total number of active functions. Additionally, a total number of clients (L) that are in communication with a system (e.g., logged into a system and able to send requests to the system) may be determined. A predicted capacity value (D) for the system may be determined based in part on the total number of logged in clients. If the predicted capacity value exceeds the available capacity value, this may indicate that an insufficient number of functions are active to process a predicted quantity of requests to be received. In such a case, one or more additional functions may be activated to process the received request, or one or more additional requests from the clients (e.g., devices or software-based clients) in communication with the system. Activation of the additional function(s) at the time a request is received may ensure that the function(s) are active to process requests at the time that additional predicted traffic is received, reducing delays associated with activation of the function(s).

In some implementations, to determine the available capacity value, a total number of functions (S) that are currently processing a request may also be determined. For example, a count of available functions (B) that are active to process requests and not currently processing a request may be determined based on the difference between the count of active functions and the count of functions currently processing requests, as indicated in Equation 1:

$$B = F - S \qquad \text{(Equation 1)}$$

A duration (T) during which a function remains active may also be determined. For example, a function, when activated, may remain active to process requests for a predetermined length of time, such as five minutes, for a user input quantity of time, or for a conditional length of time, such becoming inactive if no request is received for five minutes. An average processing time (t) for processing of a single request by a function may additionally be determined. The average processing time may include a mean, mode, or median time. In some implementations, different average processing times may be determined for different types of requests. For example, a request associated with the retrieval of data, such as a request to view information associated with an item, may be processed more quickly than a request associated with a complex workflow, such as a request to purchase an item. A count of requests (A) processed per function may be determined based on the duration of a function and the average processing time for a request, as indicated in Equation 2:

$$A = T/t \qquad \text{(Equation 2)}$$

The available capacity value for a system may be determined based on the count of requests processed per function and the count of available functions that are active to process a request and not currently processing a request, as indicated in Equation 3:

$$C = A*B = (T/t)*(F-S) \qquad \text{(Equation 3)}$$

In some implementations, the predicted capacity value may be determined based in part on a probability value (U) indicative of a likelihood of additional requests or other traffic from one or more clients. For example, at least a single request may be expected from each client accessing the system. The probability value may indicate a percentage of clients accessing the system for which an additional request is expected. Continuing the example, a probability value of 0.2 may be used if 20% of the clients accessing the system are expected to provide at least a second request. The probability value may be determined based in part on traffic data indicative of historical requests. For example, during times when increased traffic is expected, such as weekends, holidays, evening hours, times when sales or other special events are occurring, and so forth, the probability value may be greater than at times associated with small quantities of traffic. In some implementations, the probability value may be determined using machine learning techniques that associate characteristics of requests, such as temporal characteristics, a request type, or other request characteristics, with quantities of expected additional traffic. In some implementations, the predicted capacity value for a system may be determined based on the count of users accessing the system, the probability value, and the average processing time for processing of a single request by a function, as indicated in Equation 4:

$$D = \{[L + (L*U)]*t\} \qquad \text{(Equation 4)}$$

Based on the available capacity value and the predicted capacity value, a predicted quantity of capacity (P) for the system that may be used to process the received request and additional predicted requests or other traffic may be determined. In some implementations, the quantity of capacity may be determined based in part on the available capacity value, the predicted capacity value, and the duration during which a function remains active, as indicated in Equation 5:

$$P = [(D-C)/T] = (\{[L+(L*U)]*t\} - [(T/t)*(F-S)])/T \qquad \text{(Equation 5)}$$

In some implementations, a first portion of content may be provided in response to a request prior to a second portion that is associated with an authentication or authorization process or activation of one or more functions. For example, the first portion of the content may include a static portion that does not require authentication or authorization of the request or performance of additional workflow processes to generate. A second portion of the content may include dynamic or other non-static types of content that is provided after an authentication process to verify the identity of a user, user account, or device. Alternatively, a second portion of the content may include non-static content that is provided after an authorization process to verify that the user or device is permitted to access the requested content. In some cases, both an authentication and authorization process may be performed. In such a case, the first portion of the content may be provided to a client prior to activating one or more additional functions or prior to performing one or more of an authentication or authorization process, to enable user viewing and interaction with the first portion concurrent with the activation of one or more functions or the performance of the authentication or authorization process(es). In other cases, non-static content may be provided subsequent to providing a static portion of the content without performing an authentication or authorization process.

As one skilled in the art will appreciate in light of this disclosure, certain embodiments may be capable of achieving certain advantages, including some or all of the following: automatic activation of device-independent functions may enable sufficient computational resources to be available to process a predicted quantity of requests or other traffic, which may prevent or reduce latency and delays associated with the activation of functions. Additionally, the automatic activation of device-independent functions, in response to a request, based on the current count of active functions and the current count of clients accessing a system, may minimize the use of unnecessary computational resources by activating functions on an as-needed basis responsive to received requests. Furthermore, use of device-independent functions, such as FaaS architectures, that cease executing after a duration, may conserve the time and resources used to deactivate host devices or other services that would be used to process requests during times when less traffic is received.

Figure 1B:
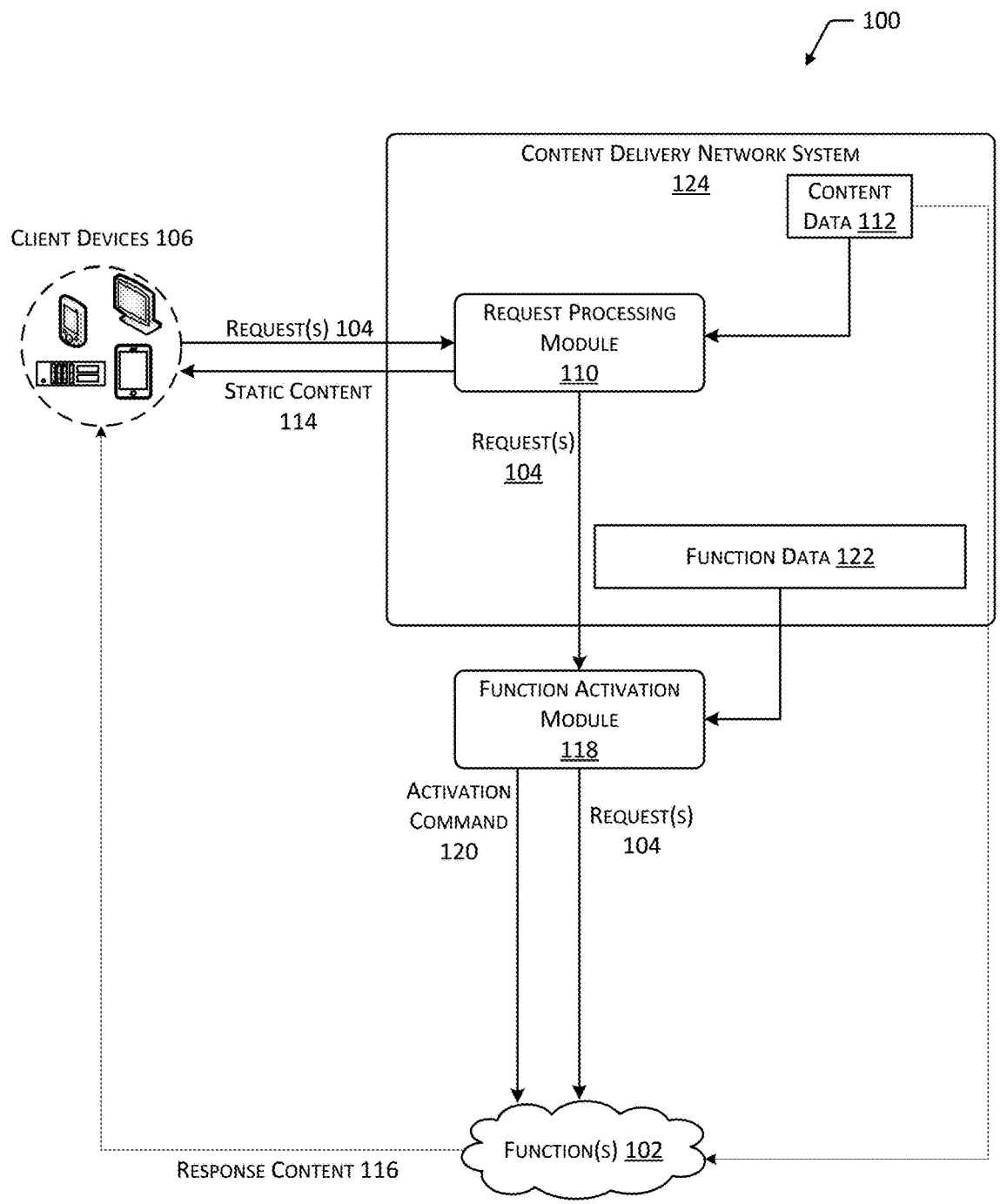
Figure 1C:
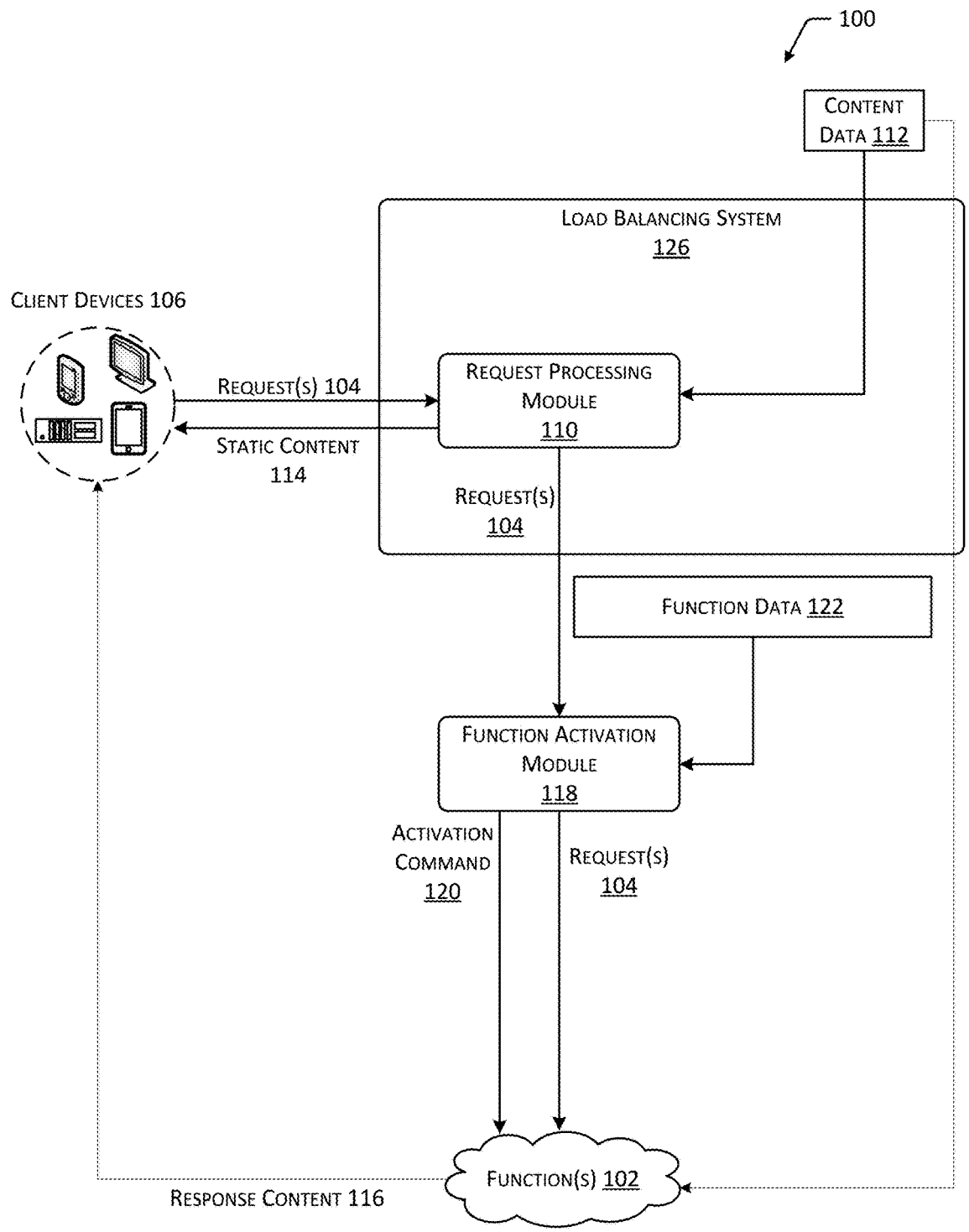

FIGS. 1A-1C depict implementations of a system 100 for determining a quantity of functions 102 or other types of services, processes, applications, and so forth to be activated in response to receiving one or more requests 104 from one or more client devices 106. In some implementations, the functions 102 may include serverless or device-independent functions 102, such as functions 102 associated with a FaaS architecture. As shown in FIG. 1A, a client device 106 may provide a request 104 to an Application Programming Interface (API) gateway 108, or another type of device-independent or machine-based application, service, or process. In some implementations, the request 104 may be provided to a load balancing device or at least a portion of a content delivery network (CDN), as described with regard to FIGS. 1B and 1C below. For example, a load balancing device may be configured to determine a predicted quantity of requests 104 based on traffic data indicative of historical counts of requests 104 or other traffic received by a system 100 and may be configured to distribute received requests across multiple servers or other devices. A CDN may be used to store and provide data to client devices 106 or other portions of the system 100. A request 104 may include an indication of content to be accessed. Client devices 106 may include, without limitation, any type of computing device, such as a portable computing device, a personal computing device, a wearable computing device, an automotive computing device, a robot, a networked media device, and so forth. For example, a client device 106 may include a smartphone, laptop computer, or other type of computing device. As another example, a client device 106 may include a networked speaker device configured to receive audio input and generate audio output in response to the audio input. As yet another example, a client device 106 may include a media player configured to provide content received via a network connection to a television or other output device. The request 104 received from the client device 106 may include data, such as of a Uniform Resource Locator (URL), that is indicative of a webpage or other type of content. In other implementations, a client device 106 may not necessarily include a separate device, and may instead include an application, service, or process operating independent of a particular device. While FIG. 1A depicts client devices 106 providing requests 104 to one or more API gateways 108, in other implementations, any manner of machine-based or device-independent function, service, process, application, and so forth may receive and process requests 104 from the client devices 106. For example, FIG. 1B depicts client devices 106 providing requests 104 to and receiving data from a content delivery network system 124, while FIG. 1C depicts client devices providing requests to and receiving content via a load balancing system 126.

A request processing module 110 may receive a request 104 from a client device 106 and process the request 104 to determine characteristics of the request 104, the client device 106 associated with the request, and content that may be responsive to the request 104. In some implementations, the request processing module 110 may access content data 112 to determine the content associated with the request 104. For example, correspondence between one or more characteristics of the request 104 and one or more portions of the content data 112 may be used to determine particular content that is responsive to the request 104. In some implementations, a first portion of the content may include static content 114 that may be provided to the client device 106 associated with the request 104 without performing authentication or authorization processes or other additional processes. For example, a first portion of the content may include a static portion of a webpage that does not include content specific to a client device 106, user account, user session, and so forth, that may be generated in response to the request 104. In some implementations, static content 114 may be provided using a content delivery network or content distribution network (CDN), or other types of content delivery services.

The function(s) 102 may be used to generate response content 116 based at least in part on the content data 112 and one or more characteristics of the request 104 or client device 106. As discussed previously, in some implementations, the functions 102 may include FaaS architectures or another type of cloud or network-based, device-independent architecture, application, service, process, or function. For example, the functions 102 may include containers or architectures for performing additional workflow processes, such as generation of webpages associated with the purchase of an item indicated in the static content 114. As another example, the functions 102 may include authentication processes used to authenticate at least a portion of a received request 104 prior to providing response content 116, such as by verifying the identity of a user account or device. In other cases, the functions 102 may include an authorization process used to determine whether a user account or device is permitted to access content associated with a request 104. As such, a function 102 that is in an "active" state may include a container associated with one or more networked computing devices that is currently prepared to receive code or other data for execution of the code or data. Conversely, if a function 102 is not currently active, an architecture must typically be prepared for receipt and execution of code or other data, which is sometimes referred to as a "cold start" of the architecture. In some implementations, static content 114 may be provided to a client device 106 prior to or concurrent with performance of one or more processes by the functions 102. For example, a user associated with a client device 106 may view or interact with static content 114 while one or more of an authentication or authorization process is performed to generate response content 116. As another example, a user may view or interact with static content 114 while one or more additional functions 102 are activated.

A function activation module 118 may activate one or more functions 102 in response to receiving a request 104. For example, as the quantity of requests 104 and other types of traffic increases, the number of active functions 102 may not be sufficient to process each request 104 at or proximate to the time that the request 104 is received. In some cases, the time used to activate an additional function 102 may be significant (e.g., five seconds or greater). To reduce or prevent delays and latency associated with the activation of functions 102, the function activation module 118 may generate an activation command 120 to activate one or more additional functions 102 in response to receipt of a request 104. In some implementations, the function activation module 118 may access function data 122 indicative of one or more rules, algorithms, or metric values used to determine the number of functions 102 that may be activated to process a predicted quantity of requests 104 or other traffic. For example, as indicated in Equation 5, a count of functions 102 used to process a predicted quantity of traffic may be determined based on a count of client devices 106 currently accessing the system 100, a count of functions 102 that are currently active, a count of active functions that are currently processing requests, a probability value indicative of a predicted quantity of future traffic, the duration that a function 102 remains active, and the average time for processing of a request 104 by a function 102. Continuing the example, if the count of functions 102 determined based on Equation 5 is greater than the current count of active functions, the activation command 120 may indicate a number of additional functions 102 to activate based on the difference between the counts. If the count of functions 102 determined based on Equation 5 is less than or equal to the current count of active functions, the currently active functions 102 may be sufficient to process the current quantity of requests 104 received from the client devices 106. In such a case, generation of the activation command 120 may be omitted, or the activation command 120 may indicate that zero additional functions 102 are to be activated.

As described previously, in some implementations, a request 104 may be provided to a load balancing device or CDN. For example, FIG. 1B depicts a content delivery network system 124 storing at least a portion of the content data 112 and the request processing module 110. In some implementations, the content delivery network system 124 may also store the function data 122. In other implementations, the function data 122 may be stored in association with other components of the system 100 associated with the function activation module 118. The content delivery network system 124 may receive requests 104 from the client devices 106 and determine static content 114 to be provided in response to the requests 104, based on the content data 112 and the characteristics of the requests 104. In some implementations, the content delivery network system 124 may also provide content data 112 to one or more activated functions 102 that provide response content 116 to the client devices 106 in response to the requests 104. Additionally, while FIG. 1B illustrates the content delivery network system 124 receiving and processing requests 104 from the client devices 106, in other implementations, the content delivery network system 124 may receive requests 104 from the client devices 106 then provide the requests 104 to other portions of the system 100. For example, the request processing module 110 may be associated with other components of the system 100 rather than the content delivery network system 124. In such cases, the content delivery network system 124 may provide content data 112 to the request processing module 110. In other cases, the content data 112 used to generate responses to the requests 104 may be associated with different components of the system 100.

As another example, FIG. 1C depicts a load balancing system 126 that receives requests 104 from the client devices 106. The load balancing system 126 may distribute the received requests 104 to multiple servers or other computing devices. For example, the load balancing system 126 may distribute received requests 104 among multiple request processing modules 110 or function activation modules 118. In some implementations, the request processing module 110 may be associated with the load balancing system 126. For example, the load balancing system 126 may process received requests 104 and provide static content 114 in response to the requests 104. Continuing the example, the load balancing system 126 may receive content data 112 from a CDN or other source to be provided to the client device 106. In other implementations, the load balancing system 126 may provide requests 104 from the client devices 106 to other components of the system 100 for processing.

Figure 2:
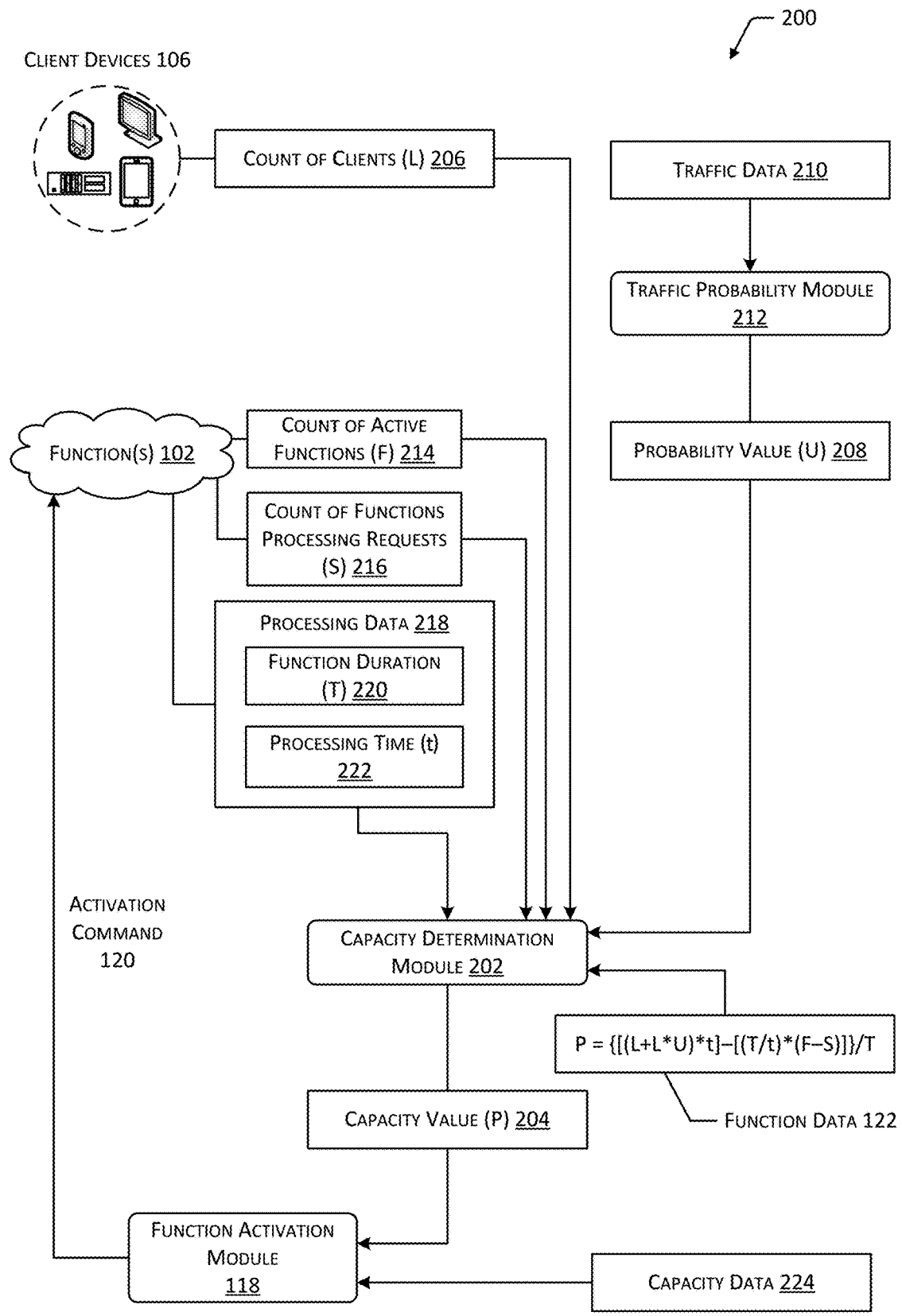
FIG. 2 depicts an implementation of a system for determining a quantity of serverless functions to activate based on data and metric values determined from client devices and currently active serverless functions.

FIG. 2 depicts an implementation of a system 200 for determining a quantity of functions 102 to activate based on data and metric values determined from client devices 106 and currently active functions 102. For example, a capacity determination module 202 may determine a capacity value 204 based on the data and metric values determined from the client devices 106 and functions 102. The capacity value 204 may be used by the function activation module 118 to determine a number of additional functions 102 to activate, which may be used to generate the activation command 120.

The capacity determination module 202 may determine a count of clients (L) 206 indicative of a number of clients or client devices 106 currently in communication with the system 200. For example, the count of clients 206 may indicate a number of devices, user accounts, or other types of clients that are currently logged into an account associated with the system 200 or otherwise in communication with the system 200 and able to provide requests 104 to the system 200. Continuing the example, each client device 106 currently accessing a system 200 would typically be expected to provide at least a single request 104 to the system 200, and in some cases, multiple requests 104. As such, the count of clients 206 may correlate to a predicted quantity of requests 104 expected to be received at a future time and may factor into the determined capacity value 204 representative of a predicted quantity of functions 102 to be maintained in an active state to accommodate the predicted requests 104.

The capacity determination module 202 may also determine a probability value 208 indicative of a predicted quantity of requests 104 or other traffic to be received. For example, traffic data 210 indicative of historical counts of requests 104 or other traffic received by a system 200 may associate counts of requests 104 with various request characteristics, such as the dates or times requests 104 are received, types or categories associated with requests 104, and so forth. For example, a larger quantity of requests 104 to purchase items may be received during evening hours, weekends, holidays, or special events such as sales or releases of new products, than at other times, such as morning hours or weekdays. As such, during a weekday morning, a count of requests 104 that includes 1.1 requests for each client device 106 accessing the system 200 may be predicted, while during a weekend evening, a count of requests 104 that includes 1.3 requests for each client device 106 may be predicted. A traffic probability module 212 may determine the probability value 208 based in part of the traffic data 210. For example, a probability value 208 of 0.1 may be determined for weekday mornings and a probability value 208 of 0.3 may be determined for weekend evenings. In some implementations, the traffic probability module 212 may use one or more machine learning techniques to determine probability values 208 based on the traffic data 210. For example, the probability value 208 at a particular time period may represent a percentage of client devices 106 for which one or more additional requests 104 beyond the initial request 104 are predicted.

The capacity determination module 202 may also determine a count of active functions (F) 214, indicative of a number of functions 102 that are currently in an active state and configured to receive and process requests 104. The count of active functions 214 may correlate to a predicted quantity of requests 104 that may be processed by the functions 102 without activating additional functions 102. For example, if a large number of functions 102 are currently active, a large number of requests 104 may be processed without incurring delays associated with activation of additional functions 102. Conversely, if a small number of functions 102 are active, a smaller number of requests 104 may be processed at one time by the functions 102 that are currently active.

In some implementations, the capacity determination module 202 may additionally determine a count of functions processing requests (S) 216. The count of functions processing requests 216 may indicate a number of functions 102 that are currently active, but that are also currently processing a request 104 and as such, are not currently able to begin processing an additional request 104. For example, if a large number of functions 102 are currently processing requests 104, a smaller number of functions 102 are available to process additional predicted requests 104.

The capacity determination module 202 may also determine processing data 218 indicative of characteristics and metric values for processing of requests 104 by functions 102. For example, FIG. 2 illustrates example processing data 218 that includes a function duration (T) 220 and a processing time (t) 222. The function duration 220 may indicate a length of time that a function 102 remains active. In some implementations the function duration 220 may indicate a length of time that a function 102 remains active when it is not currently being executed to process a request 104. For example, a function 102 may be configured to remain active for a duration of five minutes if it is not used to process a request 104. The processing time 222 may indicate a length of time to process a single request 104 by a single function 102. In some implementations, the processing time 222 may include an average processing time (e.g., a mean, mode, or median time). For example, each request 104 may be processed over a different period of time based on characteristics of the particular request 104, characteristics of the particular function 102 that is processing the request 104, or various network characteristics. Use of an average processing time may enable the capacity of the active functions 102 to process additional requests 104 to be predicted more accurately. In other implementations, the processing time 222 may be determined based on characteristics of one or more requests 104 or of one or more functions 102. For example, a first type of request 104 may be associated with a first processing time 222, while a second type of request 104 is associated with a second processing time 222. The traffic data 210 may indicate times during which receipt of particular types of requests 104 may be predicted, and in such cases, the processing times 222 associated with the predicted types of requests 104 may be used to determine the available capacity of the functions 102 to process the predicted requests 104.

The capacity determination module 202 may determine the capacity value 204 based on one or more of the count of clients 206, probability value 208, count of active functions 214, count of functions processing requests 216, function duration 220, or processing time 222. The capacity determination module 202 may access function data 122 indicative of one or more rules, algorithms, values, or other types of data that may be used to determine the capacity value 204 based on the other data determined from the client devices 106, functions 102, and traffic probability module 212. For example, Equation 5, above, describes a manner in which the capacity value 204 may be determined based on the count of clients 206, probability value 208, count of active functions 214, count of functions processing requests 216, function duration 220, and processing time 222.

The function activation module 118 may generate an activation command 120 indicative of a number of functions 102 to be activated based on the capacity value 204 and capacity data 224. Capacity data 224 may indicate a relationship between one or more capacity values 204 and corresponding counts of functions 102. For example, the capacity value 204 may not necessarily indicate a direct count of functions 102, but may instead indicate an independent value indicative of additional capacity for the system 200 that may be needed to process predicted requests 104 or other traffic. Correspondence between the capacity value 204 and the capacity data 224 may be used to determine a count of functions 102 to be activated based on the capacity value 204.

Figure 3:
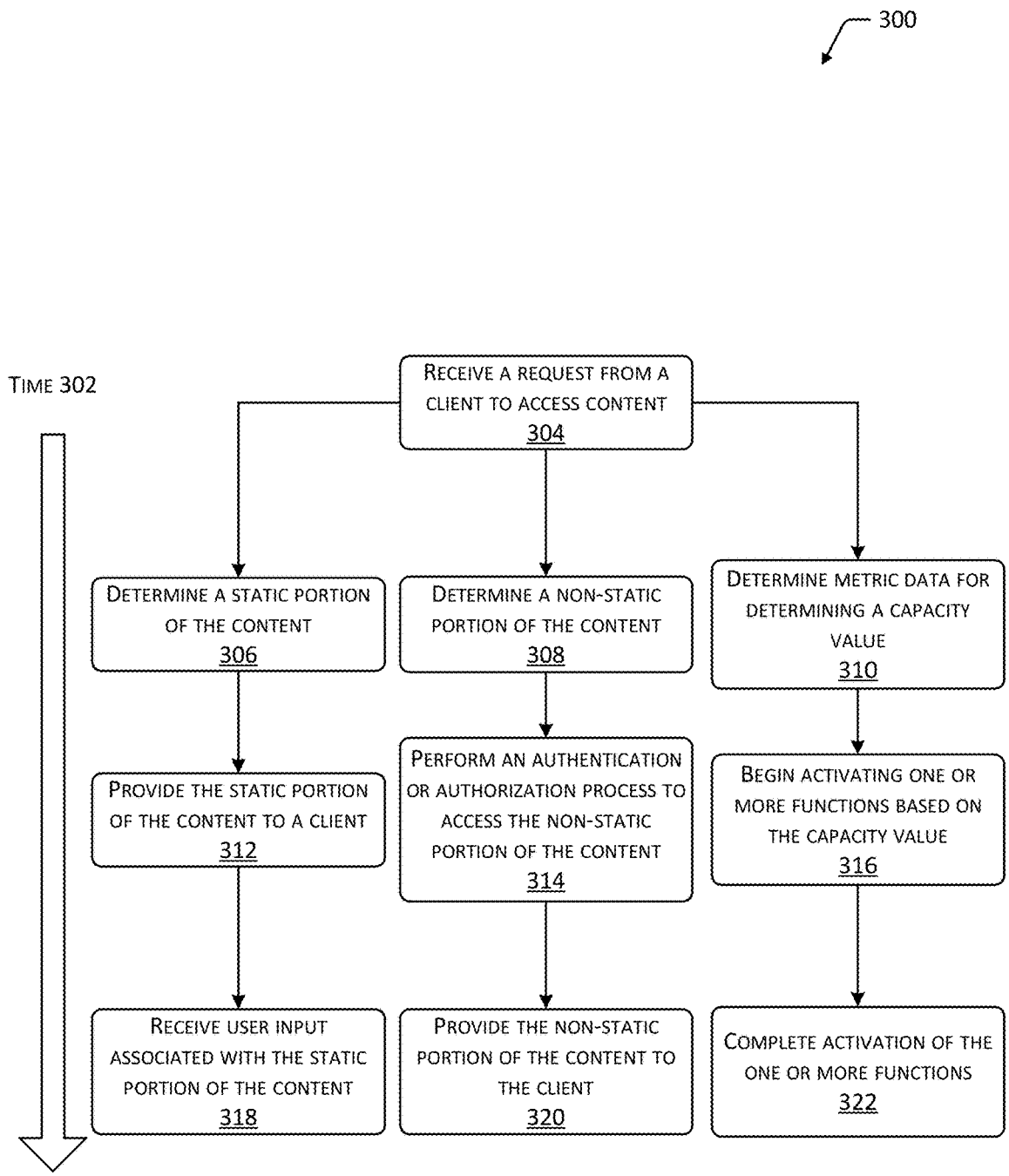
FIG. 3 is a flow diagram illustrating a method for providing content to client devices and activating serverless functions based on capacity values determined using metric data from client devices and serverless functions.

FIG. 3 is a flow diagram 300 illustrating a method for providing content to client devices 106 and activating functions 102 based on capacity values 204 determined using metric data from client devices 106 and functions 102. An arrow shown along the left border of FIG. 3 illustrates the passage of time 302. While certain elements of FIG. 3 are shown vertically proximate to one another relative to the arrow indicating time 302, these elements may not necessarily occur concurrently with one another but could occur consecutively in some implementations.

At 304, a request 104 may be received from a client to access content. As described with regard to FIG. 1, a client device 106 may provide a request 104 to access content, such as a request 104 to view a webpage, purchase an item, transmit a message, modify data associated with a user account, and so forth. In some cases, a response associated with a request 104 may be provided using existing data, while in other cases, a response may be generated based on characteristics of the request 104 or the client providing the request 104. For example, data associated with a user account may be retrieved and included in a webpage provided to a client device 106. As another example, a request 104 associated with a particular workflow that includes multiple processes, such as the purchase of an item, may cause output associated with the purchase process to be generated in response to the request 104.

In some cases, a first portion of the content associated with the request 104 may include static content 114 that may be provided to a client in the absence of generating additional data or preforming an authentication or authorization process. In such a case, at 306, a static portion of the content may be determined. Additionally, at 308, a non-static portion of the content may be determined. For example, a second portion of the content may be associated with an authentication process to verify the identity of a user account, user device, and so forth, an authorization process to determine whether a user account or device is permitted to access the requested content, or both an authentication and an authorization process. The second portion of the content may be generated after performance of the authentication or authorization process(es). As another example, the second portion of the content may be generated at least in part based on the characteristics of the request 104 and the client from which the request 104 originates.

At 310, at or proximate to the time 302 at which the static and non-static portions of the content are determined, metric data for determining a capacity value 204 may be determined. As described with regard to FIG. 2, metric data that may be used to determine a capacity value 204 may include one or more of a count of clients 206 accessing a system 200, a probability value 208 indicative of a percentage of clients from which multiple requests 104 may be predicted, a count of active functions 214, a count of functions processing requests 216, a function duration 220, or a processing time 222 for processing of a request 104 by a function 102. In some implementations, at 310, one or more of the metric values may be modified based on the received request 104. For example, if an additional client device 106 accesses the system 200 to provide the request 104, then the count of clients 206 accessing the system 200 may be modified. Additionally, if a function 102 is used to process the request 104, the count of functions processing requests 216 may be modified. Also, each time that a request 104 is received, one or more clients accessing the system 200 may have terminated access, or additional clients may have accessed the system, and the count of clients 206 may have changed since receipt of a previous request 104. Similarly, each time that a request 104 is received, the duration for one or more functions 102 may have lapsed or one or more additional functions 102 may have been activated, and the count of active functions 214 may have changed. Also, based on the current date, time, the presence or absence of an event, or the characteristics of the request 104 or client associated with the request 104, the probability value 208 or processing time 222 may differ.

At 312, the static portion of the content may be provided to a client. For example, because static content 114 may be based on existing data and may not require performance of one or more of an authentication or authorization process or generation of additional data, static content 114 may be available to provide to a client promptly after receipt of a request 104. Providing static content 114 to a client may enable a user to begin interacting with content without experiencing delays associated with authentication or authorization processes or activation of functions 102, thus improving user experiences.

At 314, an authentication or authorization process to access the non-static portion of the content may be performed. In some implementations, the process may be performed at least partially concurrently with the provision of static content 114 to the client or receipt of user interactions associated with the static content 114. In other implementations, the non-static content may be generated and provided to a client without performance of an authentication or authorization process. In such a case, block 314 may be omitted. In still other implementations, both an authentication and an authorization process may be performed. For example, an authentication process may include a process to verify the identity of a user account or user device. An authorization process may include a process to determine that the user account or device is permitted to access the content associated with the request 104.

At 316, activation of one or more functions 102 may be begun based on the determined capacity value 204. As described with regard to FIGS. 1 and 2, in some cases, activation of a function 102, such as a serverless or device-independent function that is not currently active to process requests 104 (e.g., a "cold start") may consume a significant length of time, such as five seconds or longer. In some implementations, activation of functions 102 may be performed at least partially concurrently with providing static content 114 to the client, receipt of user interactions associated with the static content 114, or performance of one or more of an authentication or authorization process associated with non-static content.

At 318, user input associated with the static portion of the content may be received. For example, user input may include a subsequent request 104 provided by the client device 106 to which the static content 114 was provided, and the non-static portion of the content may include at least a portion of a response associated with the subsequent request 104. In other cases, the user input may be unrelated to the non-static portion of the content.

At 320, the non-static portion of the content may be provided to the client. Provision of the non-static portion of the content may occur prior to, concurrent with, or subsequent to receipt of user interactions associated with the static content 114. At 322, activation of one or more functions 102 may be completed. Similarly, completion of the activation of the functions 102 may occur prior to, concurrent with, or subsequent to receipt of user interactions associated with the static content 114. In some implementations, subsequent to activation of one or more functions 102, metric data, such as the count of active functions 214, may be modified.

Figure 4:
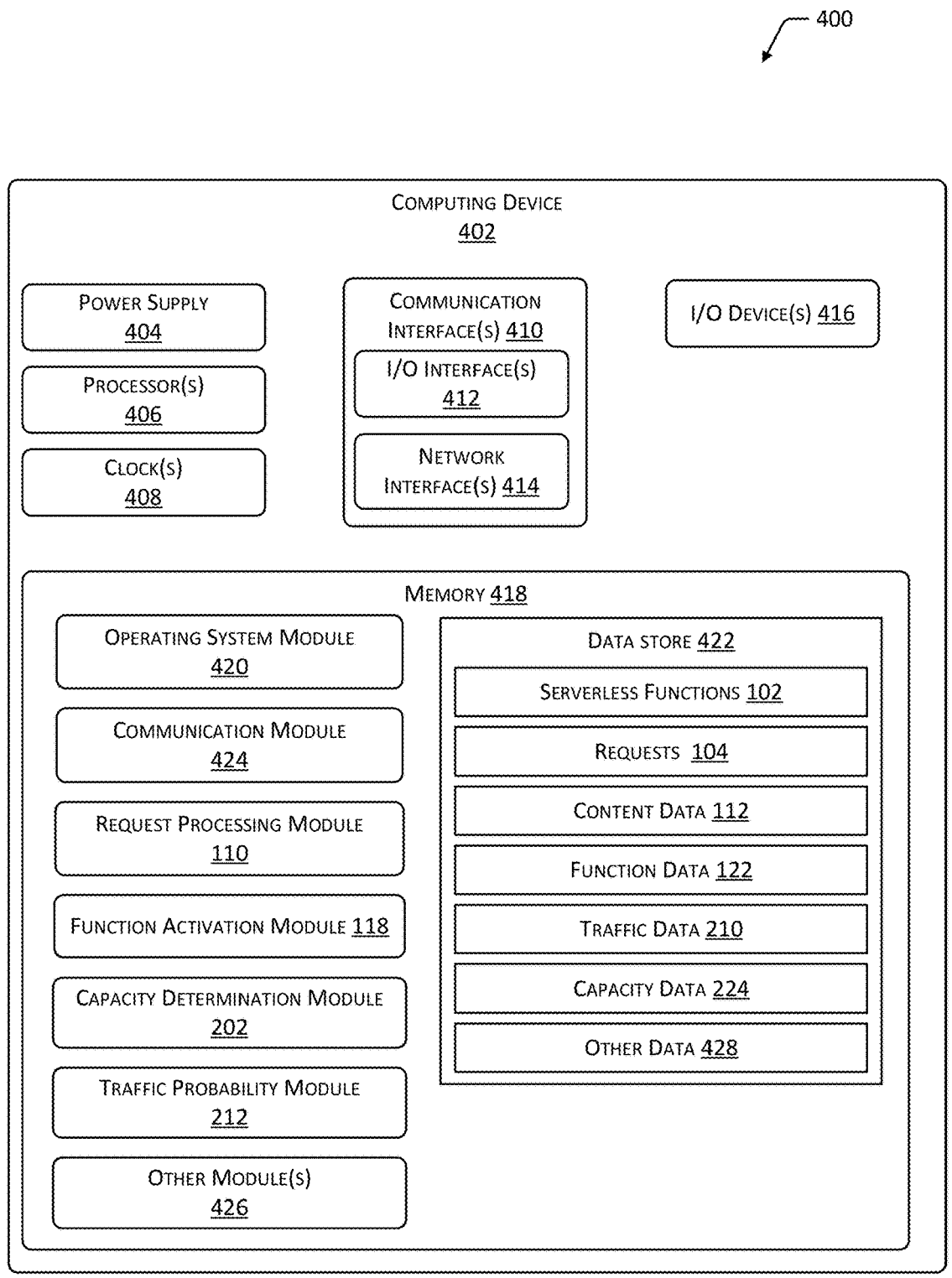
FIG. 4 is a block diagram illustrating an implementation of a computing device within the present disclosure.

FIG. 4 is a block diagram 400 illustrating an implementation of a computing device 402 within the present disclosure. In some implementations, the computing device 402 may include one or more servers or other types of computing devices 402. In other implementations, the computing device 402 may include one or more serverless or device-independent architectures. For example, one or more of the capabilities described with regard to the computing device 402 may be performed by a device-independent function 102, a client device 106, an API gateway 108, or another type of process, function, service, and so forth in communication with the computing device 402. While FIG. 4 depicts a single block diagram 400 representative of a computing device 402, any number of networked computing devices 402 or device-independent processes, services, or functions 102 may perform the implementations described herein.

One or more power supplies 404 may be configured to provide electrical power suitable for operating the components of the computing device 402. In some implementations, the power supply 404 may include a rechargeable battery, fuel cell, photovoltaic cell, power conditioning circuitry, and so forth.

The computing device 402 may include one or more hardware processor(s) 406 (processors) configured to execute one or more stored instructions. The processor(s) 406 may include one or more cores. One or more clock(s) 408 may provide information indicative of date, time, ticks, and so forth. For example, the processor(s) 406 may use data from the clock 408 to generate a timestamp, trigger a preprogrammed action, and so forth.

The computing device 402 may include one or more communication interfaces 410, such as input/output (I/O) interfaces 412, network interfaces 414, and so forth. The communication interfaces 410 may enable the computing device 402, or components of the computing device 402, to communicate with other computing devices 402 or components of the other computing devices 402. The I/O interfaces 412 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 412 may couple to one or more I/O devices 416. The I/O devices 416 may include any manner of input device or output device associated with the computing device 402. For example, I/O devices 416 may include touch sensors, keyboards, mouse devices, microphones, image sensors (e.g., cameras), scanners, displays, speakers, haptic devices, printers, weight sensors, code reading devices, RFID devices, NFC devices, and so forth. In some implementations, the I/O devices 416 may be physically incorporated with the computing device 402 or may be externally placed.

The network interfaces 414 may be configured to provide communications between the computing device 402 and other devices, such as the I/O devices 416, routers, access points, and so forth. The network interfaces 414 may include devices configured to couple to one or more networks including local area networks (LANs), wireless LANs (WLANs), wide area networks (WANs), wireless WANs, and so forth. For example, the network interfaces 414 may include devices compatible with Ethernet, Wi-Fi, Bluetooth, ZigBee, Z-Wave, 3G, 4G, LTE, and so forth.

The computing device 402 may include one or more busses or other internal communications hardware or software that allows for the transfer of data between the various modules and components of the computing device 402.

As shown in FIG. 4, the computing device 402 may include one or more memories 418. The memory 418 may include one or more computer-readable storage media (CRSM). The CRSM may be any one or more of an electronic storage medium, a magnetic storage medium, an optical storage medium, a quantum storage medium, a mechanical computer storage medium, and so forth. The memory 418 may provide storage of computer-readable instructions, data structures, program modules, and other data for the operation of the computing device 402. A few example modules are shown stored in the memory 418, although the same functionality may alternatively be implemented in hardware, firmware, or as a system on a chip (SoC).

The memory 418 may include one or more operating system (OS) modules 420. The OS module 420 may be configured to manage hardware resource devices such as the I/O interfaces 412, the network interfaces 414, the I/O devices 416, and to provide various services to applications or modules executing on the processors 406. The OS module 420 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 422 and one or more of the following modules may also be associated with the memory 418. The modules may be executed as foreground applications, background tasks, daemons, and so forth. The data store(s) 422 may use a flat file, database, linked list, tree, executable code, script, or other data structure to store information. In some implementations, the data store(s) 422 or a portion of the data store(s) 422 may be distributed across one or more other devices including other computing devices 402, network attached storage devices, and so forth.

A communication module 424 may be configured to establish communications with one or more other computing devices 402. Communications may be authenticated, encrypted, and so forth.

The memory 418 may also store the request processing module 110. The request processing module 110 may determine correspondence between characteristics of a received request 104 and content data 112 to determine particular content that may be used to generate a response associated with the request 104. In some implementations one or more portions of the content may include static content 114 that may be provided to a client shortly after receipt of the request 104, while other portions of the content may include non-static content, such as content associated with one or more of an authentication or authorization process or content that is generated in response to one or more characteristics of the request 104 or client.

The memory 418 may additionally store the function activation module 118. The function activation module 118 may generate an activation command 120 indicative of a quantity of functions 102 to be activated in response to receipt of a request 104. As described with regard to FIGS. 1-3 and indicated in Equation 5, the count of functions 102 to be activated may be determined based at least in part on a count of clients 206 accessing a system 200, a probability value 208 indicative of a predicted quantity of future requests 104, a count of active functions 214, a count of functions processing requests 216, a function duration 220, and a processing time 222 for processing of a request 104 by a function 102. In cases where the capacity of the currently active functions 102 to process requests 104 equals or exceeds the capacity needed to process a predicted future quantity of requests 104, generation of an activation command 120 may be omitted, or the activation command 120 may indicate that zero additional functions 102 are to be activated.

The memory 418 may further store the capacity determination module 202. The capacity determination module 202 may generate a capacity value 204 based on one or more of count of clients 206, the probability value 208, the count of active functions 214, the count of functions processing requests 216, the function duration 220, or the processing time 222 for processing of a request 104 by a function 102. The capacity value 204 may be used, such as by the function activation module 118 to generate the activation command 120. For example, based on correspondence between the capacity value 204 and capacity data 224, a quantity of functions 102 associated with the capacity value 204 may be determined. The activation command 120 may indicate the determined quantity of functions 102.

The memory 418 may also store the traffic probability module 212. The traffic probability module 212 may determine probability values 208 based on traffic data 210. For example, traffic data 210 may associate quantities or characteristics of historic traffic, such as requests 104 previously received by a system 200, with characteristics of requests 104, such as times that requests 104 are received. The probability value 208 may indicate a portion, such as a percentage, of clients currently accessing a system 200 from which receipt of more than one request 104 is predicted. For example, a probability value 208 of 0.3 may be used if a second request 104 from 30% of the clients currently accessing the system 200 is expected. In some implementations, the traffic probability module 212 may include one or more machine learning techniques or algorithms that may be used to determine probability values 208 based on historic traffic data 210.

Other modules 426 may also be present in the memory 418. For example, encryption modules may be used to encrypt and decrypt communications between computing devices 402. Authentication modules may be used to authenticate communications sent or received by computing devices 402. Other modules 426 may also include modules for detecting characteristics of a computing device 402, such as characteristics of a client device 106 that may affect the manner in which requests 104 are processed or responses are generated.

Other data 428 within the data store(s) 422 may include user input data, such as configurations, settings, preferences, and default values associated with computing devices 402. Other data 428 may include encryption keys and schema, access credentials, and so forth.

In different implementations, different computing devices 402 may have different capabilities or capacities. For example, servers may have greater processing capabilities or data storage capacity than client devices 106.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   one or more memories storing computer-executable instructions; and
   one or more hardware processors to execute the computer-executable instructions to:
   receive, from a client device, a request to access content;
   determine a first count (F) of device-independent functions that are active to process requests;
   determine a second count (S) of the device-independent functions that are processing requests;
   determine a third count (L) of client devices in communication with the one or more hardware processors;
   determine, based on the first count, the second count, and the third count, a fourth count of device-independent functions associated with a quantity of capacity (P) to process: the request from the client device and one or more requests from the third count of client devices;
   determine a difference between the first count and the fourth count; and
   activate one or more device-independent functions to process the request based on the difference between the first count and the fourth count.

2. The system of claim 1, further comprising computer-executable instructions to:
   determine a first time at which the request is received from the client device; and
   determine a probability value (U) based on traffic data indicative of a historical count of requests received from client devices at a second time that corresponds to the first time, wherein the fourth count is further determined based on the probability value.

3. The system of claim 2, further comprising computer-executable instructions to:
   determine a duration (T) associated with execution of a device-independent function; and
   determine an average time (t) associated with processing of a request by a device-independent function, wherein the fourth count is further determined based on the duration and the average time.

4. The system of claim 3, wherein the quantity of capacity (P) is determined based at least in part using the equation:

$$P=\{[((L+L*U)*t)-((T/t)*(F-S))]/T\}.$$

5. A method comprising:
   receiving, by a computing device, a request to access content;
   determining a first count of functions active to process requests;
   determining a second count of clients in communication with the computing device;
   determining a request characteristic of the request;
   determining, based on correspondence between the request characteristic and traffic data indicative of previous requests, a probability value indicative of a predicted quantity of future requests;
   determining, based on the first count, the second count, and the probability value, a third count of functions for processing: the request and the predicted quantity of future requests; and
   activating at least one function based on a relationship between the first count and the third count.

6. The method of claim 5, further comprising:
   determining a fourth count indicative of a subset of the first count of functions currently processing one or more requests; and
   determining an available capacity value based on a difference between the first count and the fourth count, wherein the third count is determined based at least in part on the available capacity value.

7. The method of claim 6, further comprising:
determining a duration associated with execution of a function;
determining an average time associated with processing of a request by a function; and
determining a fifth count of requests served per function based on a relationship between the duration and the average time, wherein the available capacity value is determined based on a product of the fifth count and the difference between the first count and the fourth count.

8. The method of claim 5, further comprising:
determining a predicted capacity value based on the probability value and the second count, wherein the third count is determined based at least in part on the predicted capacity value.

9. The method of claim 8, further comprising:
determining a time associated with processing of a request by a function, wherein the predicted capacity value is further determined based on the time associated with processing of a request by a function.

10. The method of claim 9, further comprising:
determining a fourth count indicative of a subset of the first count of functions currently processing one or more requests;
determining a duration associated with execution of a function; and
determining an available capacity value based on the fourth count, the first count, the duration, and the time associated with processing of a request by a function, wherein the third count is determined based in part on a relationship between the available capacity value and the predicted capacity value.

11. The method of claim 5, further comprising:
providing a first portion of the content to a source associated with the request prior to activating the at least one function; and
providing a second portion of the content to the source subsequent to activating the at least one function.

12. The method of claim 11, further comprising:
determining that the second portion of the content is associated with one or more of an authentication process or an authorization process, wherein the first portion is provided to the source prior to performing the one or more of the authentication process or the authorization process; and
performing the one or more of the authentication process or the authorization process prior to providing the second portion to the source.

13. A system comprising:
one or more memories storing computer-executable instructions; and
one or more hardware processors to execute the computer-executable instructions to:
receive a first request to access first content;
determine a probability for receiving a second request;
determine a first count of functions active to process requests;
determine a second count of clients in communication with the one or more hardware processors;
determine, based on the first count, the second count, and the probability, a third count of functions for processing the second request;
activate one or more functions based on the third count;
receive the second request; and
process the second request using the one or more functions.

14. The system of claim 13, further comprising computer-executable instructions to:
provide the first content to a source associated with the first request prior to performing one or more of an authentication process or an authorization process associated with the second request; and
perform the one or more of the authentication process or the authorization process associated with the second request at least partially concurrently with activating the one or more functions.

15. The system of claim 13, further comprising computer-executable instructions to:
provide the first content to a source associated with the first request at least partially concurrently with activating the one or more functions.

16. The system of claim 13, further comprising computer-executable instructions to:
determine a request characteristic associated with the first request;
determine, based on correspondence between the request characteristic and traffic data that associates request characteristics with counts of subsequent requests, a probability value (U) indicative of a predicted quantity of future requests; and
determine a predicted capacity value (D) based on the probability value and the second count of clients (L), wherein the third count is determined based in part on the predicted capacity value.

17. The system of claim 16, further comprising computer-executable instructions to:
determine a time (t) associated with processing of a request by a function, wherein the predicted capacity value is determined based in part on the equation:

$$D=[(L+L*U)*t].$$

18. The system of claim 16, further comprising computer-executable instructions to:
determine a duration (T) associated with execution of a function;
determine a fourth count (S) indicative of a subset of the first count (F) of functions currently processing one or more requests; and
determine an available capacity value (C) based on a time (t) associated with processing of a request, the duration associated with execution of a function, the first count, and the fourth count, wherein the third count is determined based in part on the available capacity value.

19. The system of claim 18, wherein the available capacity value (C) is determined based in part on the equation:

$$C=[(T/t)*(F-S)].$$

20. The system of claim 18, further comprising computer-executable instructions to:
determine a capacity utilization value based on the available capacity value and the predicted capacity value, wherein the third count is determined based in part on the capacity utilization value.

* * * * *